United States Patent
Suzuki

(10) Patent No.: US 8,343,377 B2
(45) Date of Patent: Jan. 1, 2013

(54) METHOD OF MAKING ACTIVE MATERIAL AND ELECTRODE

(75) Inventor: Hisashi Suzuki, Tokyo (JP)

(73) Assignee: TDK Corporation, Tokyo (JP)

( * ) Notice: Subject to any disclaimer, the term of this patent is extended or adjusted under 35 U.S.C. 154(b) by 686 days.

(21) Appl. No.: 12/616,997

(22) Filed: Nov. 12, 2009

(65) Prior Publication Data

US 2010/0123096 A1    May 20, 2010

(30) Foreign Application Priority Data

Nov. 14, 2008    (JP) ................................ P2008-292474

(51) Int. Cl.
    *H01M 4/88*     (2006.01)
    *H01M 4/48*     (2010.01)
    *H01M 4/485*    (2010.01)

(52) U.S. Cl. ................. 252/182.1; 429/231.95

(58) Field of Classification Search ............... 252/182.1; 429/231.95
    See application file for complete search history.

(56) References Cited

U.S. PATENT DOCUMENTS

| | | | |
|---|---|---|---|
| 2006/0071198 A1 * | 4/2006 | Paulsen et al. | 252/500 |
| 2006/0185769 A1 | 8/2006 | Nakayama et al. | |
| 2009/0226725 A1 | 9/2009 | Myeong et al. | |

FOREIGN PATENT DOCUMENTS

| | | |
|---|---|---|
| JP | A-4-319260 | 11/1992 |
| JP | A-7-288127 | 10/1995 |
| JP | A-2000-200605 | 7/2000 |
| JP | A-2003-109599 | 4/2003 |
| JP | WO03/069702 A1 | 8/2003 |
| JP | A-2003-331846 | 11/2003 |
| JP | A-2005-85471 | 3/2005 |
| JP | A-2005-85635 | 3/2005 |
| JP | A-2005-276454 | 10/2005 |
| JP | A-2006-107763 | 4/2006 |
| JP | A-2006-156032 | 6/2006 |
| JP | A-2007-18743 | 1/2007 |

OTHER PUBLICATIONS

Chen et al., "Studies of $LiCoO_2$ Coated with Metal Oxides," *Electrochemical and Solid-State Letters*, vol. 6, No. 11, 2003, pp. A221-A224, The Electrochemical Society, Inc.
Chen et al., "Methods to obtain excellent capacity retention in $LiCoO_2$ cycled to 4.5 V," *Electrochimica Acta*, vol. 49, 2004, pp. 1079-1090, Elsevier.
Kannan et al., "High Capacity Surface-Modified $LiCoO_2$ Cathodes for Lithium-Ion Batteries," *Electrochemical and Solid-State Letters*, vol. 6, No. 1, 2003, pp. A16-A18, The Electrochemical Society, Inc.

* cited by examiner

*Primary Examiner* — Peter F Godenschwager
(74) *Attorney, Agent, or Firm* — Oliff & Berridge, PLC

(57) ABSTRACT

There is provided a method of making an active material with satisfactory cycle characteristics. The method of making an active material according to the invention comprises contacting an aqueous solution containing a metal-fluoro complex and lithium salt with lithium-containing metal oxide particles.

5 Claims, 7 Drawing Sheets

(a)

(b)

(a)

(b)

METHOD OF MAKING ACTIVE MATERIAL AND ELECTRODE

BACKGROUND OF THE INVENTION

1. Field of the Invention

The present invention relates to a method for making an active material and electrode to be used in rechargeable electrochemical elements such as lithium ion secondary batteries and electrical double layer capacitors.

2. Related Background Art

Rechargeable electrochemical elements such as lithium ion secondary batteries and electrical double layer capacitors (EDLC) are widely used or under research and development for cellular phones, laptop computers, PDAs, automobiles and the like. The major positive electrode active materials in lithium ion secondary batteries are $LiCoO_2$, $LiNi_xCo_{1-x}O_2$, $LiMn_2O_4$, $LiCo_xNi_yMn_{1-x-y}O_2$ and $LiCo_xNi_yAl_{1-x-y}O_2$. Primarily employed or researched as negative electrode active materials are carbonaceous materials such as artificial graphite, natural graphite, mesocarbon microbeads (MCMB), coke, fibrous carbon, surface-modified carbon and the like, as well as tin compounds and silicon compounds. The maximum charging voltage of batteries combining these positive electrode active materials and negative electrode active materials is 4.1-4.2 V, and the energy density is at most 400-500 Wh/L.

Along with the increase in energy consumption of appliances in recent years, there has been a demand for even higher energy density for batteries. However, it is becoming difficult to obtain greater energy density through battery design optimization (reducing the thickness of the container housing the constituent elements of the battery, or reducing the thickness of the positive/negative electrode collectors and separator).

One method of realizing higher energy density utilizes the capacity of the high potential sections of the positive electrode active material, rather than the potential in the regions conventionally used for charge/discharge. In other words, this method attempts to increase the energy density by raising the charging voltage of the battery. For example, $LiCo_xNi_yMn_{1-x-y}O_2$ can raise the discharge capacity by increasing the charging voltage (~4.6 V vs $Li/Li^+$) above the conventional charging voltage (4.2 V-4.3 V vs $Li/Li^+$), thus allowing the energy density to be increased.

However, increasing the charging voltage can lead to new problems such as reduced cycle life and storage characteristics of the battery (due to decomposition of the electrolyte solution/electrolytes/positive electrode active material), and lower thermostability of the battery (due to a lower exothermic peak temperature or greater heat release of the positive electrode active material). Methods of covering positive electrode active material surfaces with oxides have been disclosed as a way of avoiding these problems (Japanese Unexamined Patent Publication HEI No. 07-288127, Japanese Unexamined Patent Publication HEI No. 04-319260 (Japanese Patent No. 2855877), Japanese Unexamined Patent Publication No. 2005-85635, Japanese Unexamined Patent Publication No. 2000-200605, Japanese Unexamined Patent Publication No. 2006-107763, Japanese Unexamined Patent Publication No. 2005-276454, Japanese Unexamined Patent Publication No. 2006-156032, Japanese Unexamined Patent Publication No. 2007-018743, Japanese Unexamined Patent Publication No. 2003-109599, Domestic Re-publication of PCT International Application No. 03-069702, Japanese Unexamined Patent Publication No. 2003-331846, Japanese Unexamined Patent Publication No. 2005-085471, Electrochemical and Solid-State Letters. 6 (11) A221-A224 (2003), Electrochimica Acta 49 (2004) 1079-1090, Electrochemical and Solid-State Letters. 6(1) A16-A18 (2003)).

SUMMARY OF THE INVENTION

In the conventional methods, however, it has not been possible to obtain sufficient cycle characteristics, although it cannot be ascertained whether or not this is due to decomposition of the electrolyte solution on the surface of the positive electrode active material which causes production of a high resistance film, and the charge-discharge cycle characteristics are particularly poor when charging is carried out at high voltage. It is desirable to provide active materials that can further improve charge-discharge cycle characteristics even when charging is not carried out at high voltage.

The present invention has been accomplished in light of these circumstances, and its object is to provide an active material and electrode with satisfactory charge-discharge cycle characteristics, as well as a method of making them.

Based on this background, the present inventors have discovered that charge-discharge cycle characteristics can be improved over the prior art by covering the surface of lithium-containing metal oxide particles with metal oxide particle groups, by a specific method. The method involves immersing the lithium-containing metal oxide particles in an aqueous solution containing a metal-fluoro complex and a lithium salt and, if necessary, adding a chemical substance known as a scavenger, so that the equilibrium of the following chemical formula (1) is shifted to the right. This method is called liquid phase deposition.

$$MF_x^{(x-2n)} + nH_2O = MO_n + xF^- + 2nH^+ \quad (1)$$

$$H_3BO_3 + 4H^+ + 4F^- = HBF_4 + 3H_2O \quad (2)$$

$$Al + 6H^+ + 6F^- = H_3AlF_6 + 3/2H_2 \quad (3)$$

Boric acid ($H_3BO_3$), aluminum (Al) and the like may be used as scavengers. Boric acid reacts with fluoride ion according to equation (2), to form $HBF_4$. Consumption of fluoride ion causes the equilibrium of equation (1) to shift toward the right, promoting production of $MO_n$ as the covering metal oxide. Al also reacts with the fluoride ion as represented by equation (3), yielding $H_3AlF_6$. As a result, the equilibrium in equation (1) shifts toward production of $MO_n$ as the metal oxide (hereinafter also referred to as "fluoro complex-derived metal oxide").

Table 1 shows an example of starting materials and products (oxides), where metal oxide particle groups are formed by such a strictly-defined liquid phase deposition (LPD) process.

TABLE 1

| Product | Starting materials | | |
|---|---|---|---|
| $ZrO_2$ | $H_2ZrF_6$ | $K_2ZrF_6$ | $(NH_4)_2ZrF_6$ |
| $SiO_2$ | $H_2SiF_6$ | $K_2SiF_6$ | $(NH_4)_2SiF_6$ |
| $TiO_2$ | $H_2TiF_6$ | $K_2TiF_6$ | $(NH_4)_2TiF_6$ |
| $ZnO$ | $ZnF_2$ | | |
| $CuO$ | $CuF_2$ | | |
| $In_2O_3$ | $InF_3$ | | |
| $SnO_2$ | $SnF_2$ | $SnF_4$ | |
| $MgO$ | $MgF_2$ | | |
| $Al_2O_3$ | $AlF_3$ | | |

When a liquid phase deposition process is employed it is possible, even with substances having surface irregularities such as active material particles, to accomplish covering with groups of metal oxide particles having dense and highly crystalline surfaces and good adhesiveness for active materials (metal oxides such as $ZrO_2$, $TiO_2$, $SiO_2$, ZnO, CuO, $In_2O_3$, $SnO_2$, MgO and $Al_2O_3$).

The method of making an active material according to the invention comprises a step of contacting an aqueous solution containing a metal-fluoro complex and lithium salt with lithium-containing metal oxide particles.

The method of making an electrode according to the invention comprises a step of contacting an aqueous solution containing a metal-fluoro complex and lithium salt with an electrode comprising an active material layer that contains lithium-containing metal oxide particles, a conductive aid, and a binder.

According to this method, particle groups of oxides of the metal in the metal-fluoro complex are formed on the surfaces of lithium-containing metal oxide particles. An electrochemical device employing an active material and electrode obtained according to the invention has more satisfactory charge-discharge cycle characteristics at high temperature (for example, 45° C.-55° C.), compared to the prior art. While the reason for this is unclear, it is believed that covering the surfaces of the lithium-containing metal oxide particles as the active material by the fluoro complex-derived metal oxide particle groups inhibits elution of the elements composing the lithium-containing metal oxide particles into the electrolyte solution, causes decomposition of the electrolyte solution/electrolyte and destruction of the lithium-containing metal oxide crystals, and improves the thermostability of the lithium-containing metal oxide particles. It is believed that another factor is that the metal oxide particle groups formed on the metal-fluoro complex have good adhesiveness for the lithium-containing metal oxide particles used as the active material, thus helping to keep the lithium-containing metal oxide bonded to the fluoro complex-derived metal oxide particle groups in the electrode, when an electrode has been fabricated using the active material. (Fabrication of an electrode involves mixing of the active material and conductive aid, etc. to form the coating material, and inadequate adhesiveness results in ablation of the fluoro complex-derived metal oxide particle groups from the lithium-containing metal oxide particles serving as the active material.) It is believed that these factors allow suitable charging to be accomplished at higher voltage than the prior art, so that volume energy density can be improved. The effect is particularly high when the lithium-containing metal oxide used is an oxide containing Li and one or more metals selected from the group consisting of Co, Ni and Mn, such as $LiCo_x Ni_y Mn_{1-x-y} O_2$. The cycle characteristics are improved even when charging is carried out at the same voltage as the prior art. In addition, when spinel manganese such as $LiMn_2O_4$ is used as the lithium-containing metal oxide, elution of manganese ion into the electrolyte solution is inhibited, thus enhancing the high-temperature cycle characteristics.

Moreover, since the metal-fluoro complex-containing aqueous solution of the invention contains a lithium salt, elution of lithium ion from the lithium-containing metal oxide into the aqueous solution is inhibited when the aqueous solution contacts the lithium-containing metal oxide. This consequently inhibits reduction in discharge capacity due to loss of the lithium component in the active material before contact with the aqueous solution. Furthermore, since the aqueous solution contains a lithium salt, the charge-discharge cycle characteristics are further enhanced compared to using an aqueous solution without a lithium salt. The reason for this is not entirely clear, but the following explanation may be made. With inhibited elution of lithium from the surface of the lithium-containing metal oxide during contact with the aqueous solution, the fluoro complex-derived metal oxide particle groups are more readily deposited onto the surface of the lithium-containing metal oxide, thus preventing excessive grain growth of the lithium-containing metal oxide in the aqueous solution. When the aqueous solution contains a lithium salt, the mean free path for the fine particles and ions in the aqueous solution is reduced, and excessive grain growth of the lithium-containing metal oxide in the aqueous solution is further inhibited. As a result, growth of the fluoro complex-derived metal oxide particle groups in the aqueous solution is inhibited, thus facilitating deposition of fluoro complex-derived metal oxide particle groups with relatively small particle sizes on the lithium-containing metal oxide surface at a high coverage factor. This presumably contributes to the improved cycle characteristics.

The metal of the metal-fluoro complex is preferably at least one metal selected from the group consisting of Zr, Si, Ti and Sn. This will produce an effect of depositing the fluoro complex-derived metal oxide particle groups composed of the metals onto the surfaces of the lithium-containing metal oxide particles, thus resulting in more excellent cycle characteristics.

The aqueous solution containing the metal-fluoro complex may also contain a scavenger that chemically scavenges fluoride ion from the metal-fluoro complex. This can promote deposition of the oxide by shifting the equilibrium of equation (1) toward the right. The aqueous solution may contain a scavenger, but this is not absolutely essential. The reason for this is conjectured to be that (lithium-containing) metal oxides themselves can function as scavengers.

As scavengers there may be mentioned boric acid, aluminum, ferrous chloride, ferric chloride, sodium hydroxide, ammonia, titanium, iron, nickel, magnesium, copper, zinc, silicon, silicon dioxide, calcium oxide, bismuth oxide, aluminum oxide, magnesium oxide and the like. Boric acid or aluminum is preferred among these.

The lithium-containing metal oxide is preferably $Li_a Ni_x Co_y Al_{1-x-y} O_2$ (where $0.98<a<1.2$, and x and y are greater than 0 and less than 1).

The pH of the aqueous solution for formation of the fluoro complex-derived metal oxide particle groups is preferably 5-12. The pH of the aqueous solution may vary during formation of the particle groups, but the lithium-containing metal oxide may dissolve with a pH of less than 5, while at a pH of greater than 12 the metal ion of the metal-fluoro complex in the aqueous solution may form a hydroxide and precipitate. Consequently, the pH of the aqueous solution may be kept at 5-12 to satisfactorily form fluoro complex-derived metal oxide particle groups.

A step of 300-900° C. heat treatment of the lithium-containing metal oxide particles with particle groups formed thereon is also preferably carried out. This can produce a single crystal from each particle of the particle groups. An effect is thus provided to inhibit dissolution of the electrolyte solution on the surface of the lithium-containing metal oxide particles 1, and further improve the cycle characteristics.

The lithium salt is preferably $LiNO_3$.

According to the invention there are provided an active material and electrode that can realize sufficient cycle characteristics, as well as a method for making them.

DESCRIPTION OF THE PREFERRED EMBODIMENT

Figure 1:
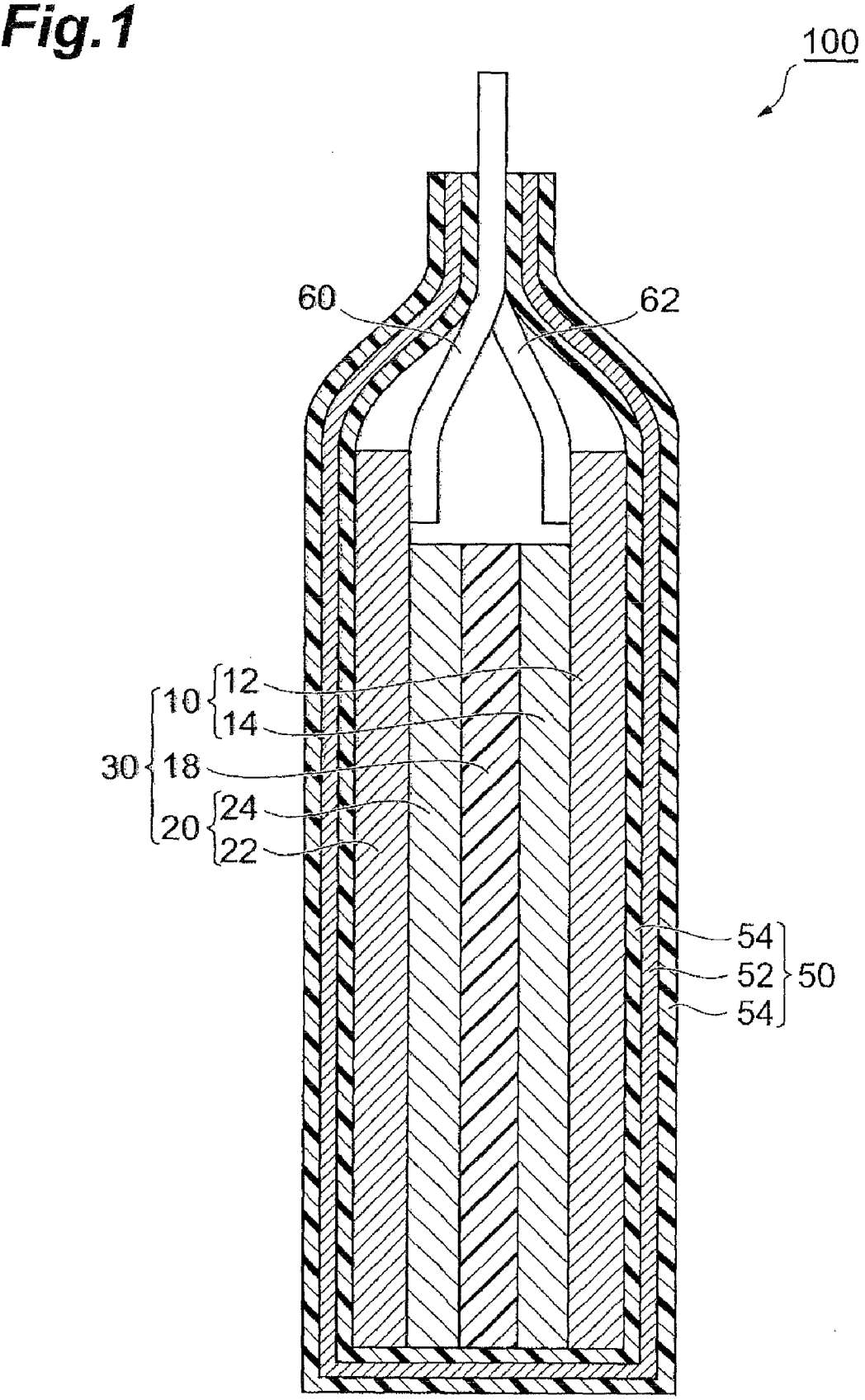
FIG. 1 is a simplified cross-sectional view showing a lithium ion secondary battery as an electrochemical device according to this embodiment.

Preferred embodiments of the invention will now be explained in detail, with reference to the accompanying drawings. Throughout the explanation of the drawings, identical or corresponding elements will be referred to by like reference numerals and will be explained only once. Also, the dimensional proportions in the drawings do not necessarily match the actual dimensional proportions.

(Electrochemical Device)

First, a lithium ion secondary battery as an electrochemical device employing an active material or electrode according to the invention will be explained briefly with reference to FIG. 1.

The lithium ion secondary battery 100 comprises, primarily, a laminated body 30, a case 50 housing the laminated body 30 in a sealed state, and a pair of leads 60, 62 connected to the laminated body 30.

The laminated body 30 has the pair of electrodes 10, 20 laid facing each other across a separator 18. The positive electrode 10 has a positive electrode active material layer 14 formed on a positive electrode collector 12. The negative electrode 20 has a negative electrode active material layer 24 formed on a negative electrode collector 22. The positive electrode active material layer 14 and negative electrode active material layer 24 contact with either side of the separator 18. Leads 60, 62 are connected at the ends of the positive electrode collector 12 and negative electrode collector 22, and the ends of the leads 60, 62 extend out of the case 50.

(First Embodiment)
(Positive Electrode and Method of Making it)
An embodiment of the invention will now be described. According to this embodiment, a positive electrode active material is formed having metal oxide particle groups already formed on lithium-containing metal oxide particles, and the surface-modified positive electrode active material is used to fabricate a positive electrode.

(Method of Making Positive Electrode Active Material)
First, lithium-containing metal oxide particles are prepared. A lithium-containing metal oxide is an oxide containing lithium and a metal other than lithium. There are no particular restrictions on the metal other than lithium, but it is preferably at least one metal selected from the group consisting of Co, Ni, Mn and Al. As examples of such lithium-containing metal oxides there may be mentioned $LiMn_2O_4$, $Li_4Ti_5O_{12}$, $LiMn_{2-x}Al_xO_4$ (where x is greater than 0 and less than 2), $LiMO_2$ (where M represents Co, Ni or Mn), $LiCo_xNi_{1-x}O_2$, $LiCo_xNi_yMn_{1-x-y}O_2$ (where x and y are greater than 0 and less than 1) and $Li_aNi_xCo_yAl_{1-x-y}O_2$ (where $0.98<a<1.2$, and x and y are greater than 0 and less than 1). For example, it is preferably $LiNi_{1/3}Mn_{1/3}Co_{1/3}O_2$ or $LiNi_{0.79}Co_{0.19}Al_{0.02}O_2$.

The particle sizes of the lithium-containing metal oxide particles are not particularly restricted but are preferably about 0.5-30 μm.

An aqueous solution containing a metal-fluoro complex and lithium salt is then prepared. As metals for the metal-fluoro complex there may be mentioned zirconium, silicon, titanium, tin, indium, magnesium, zinc, aluminum and the like, with zirconium, silicon, titanium and tin being preferred.

As specific metal-fluoro complexes there may be mentioned one or more selected from the group consisting of hexafluorozirconic acid ($H_2ZrF_6$), hexafluorosilicic acid ($H_2SiF_6$), hexafluorotitanic acid ($H_2TiF_6$), salts of the foregoing, tin fluoride ($SnF_2$, $SnF_4$), indium fluoride ($InF_3$), magnesium fluoride ($MgF_2$), zinc fluoride ($ZnF_2$) and aluminum fluoride ($AlF_3$).

As salts of metal-fluoro complexes there may be mentioned potassium salts, calcium salts and ammonium salts, of which examples include $K_2ZrF_6$, $K_2SiF_6$, $K_2TiF_6$, $CaZrF_6$, $CaSiF_6$, $CaTiF_6$, $(NH_4)_2ZrF_6$, $(NH_4)_2SiF_6$ and $(NH_4)_2TiF_6$.

Such metal-fluoro complexes can also be obtained, for example, by dissolving a non-fluoro-complex metal compound in aqueous hydrofluoric acid (HF), aqueous ammonium hydrogenfluoride ($NH_4F.HF$) or the like. For example, dissolution of iron oxyhydroxide (FeOOH) and cobalt hydroxide ($Co(OH)_2$) in aqueous $NH_4F.HF$ produces metal-fluoro complexes such as $FeF_6^{3-}$ and $CoF_6^{4-}$ in aqueous solution, which are useful for the invention.

The concentration of the metal-fluoro complex in the aqueous solution is preferably about 0.001 M-1 M. Here, M=mol/L.

There are no particular restrictions on the lithium salt, and as examples there may be mentioned lithium nitrate, lithium acetate, lithium carbonate, lithium oxalate and lithium hydroxide.

The concentration of the lithium salt in the aqueous solution will be limited by the solubility of the lithium salt in water, but it is preferably 0.1 M-5 M and more preferably 1 M-3 M.

The aqueous solution may also contain a scavenger that can withdraw fluoride ion ($F^-$) from the metal-fluoro complex. Addition of a scavenger can accelerate surface modification.

As scavengers there may be used boric acid ($H_3BO_3$), aluminum (Al), ferrous chloride ($FeCl_2$), ferric chloride ($FeCl_3$), sodium hydroxide (NaOH), ammonia ($NH_3$), titanium (Ti), iron (Fe), nickel (Ni), magnesium (Mg), copper (Cu), zinc (Zn), silicon (Si), silicon dioxide ($SiO_2$), calcium oxide (CaO), bismuth oxide ($Bi_2O_3$), aluminum oxide ($Al_2O_3$), magnesium oxide (MgO) and the like.

The concentration of boric acid, when used, is preferably about 0.001 M-1 M in the treatment solution.

The lithium-containing metal oxide particles are contacted with the aqueous solution containing the metal-fluoro complex and lithium salt. Specifically, the lithium-containing metal oxide particles are loaded into the aqueous solution containing the metal-fluoro complex and lithium salt, and stirred if necessary. When a scavenger such as boric acid is used, alternatively the scavenger such as boric acid is not mixed into the aqueous solution from the start, but rather the lithium-containing metal oxide particles are dispersed into an aqueous solution of the scavenger such as boric acid and the aqueous solution containing the metal-fluoro complex and lithium salt is then added dropwise thereto.

In the aqueous solution, the following equilibrium reaction:

$$MF_x^{(x-2n)} + nH_2O \longleftrightarrow MO_n + xF^- + 2nH^+ \qquad (1)$$

is established, and the presence of $H_3BO_3$ or Al as a scavenger causes the following reactions:

$$H_3BO_3 + 4H^+ + 4F^- = HBF_4 + 3H_2O \quad (2)$$

$$Al + 6H^+ + 6F^- = H_3AlF_6 + 3/2H_2 \quad (3),$$

shifting the equilibrium of formula (1) to the right.

Specifically, boric acid reacts with fluoride ion according to equation (2), to form $HBF_4$. As fluoride ion is consumed, the equilibrium of equation (1) shifts toward the right, promoting production of the fluoro complex-derived metal oxide $MO_n$. Al also reacts with the fluoride ion as represented by equation (3), yielding $H_3AlF_6$. As a result, the equilibrium in equation (1) shifts toward production of $MO_n$ as the fluoro complex-derived metal oxide.

Figure 2:
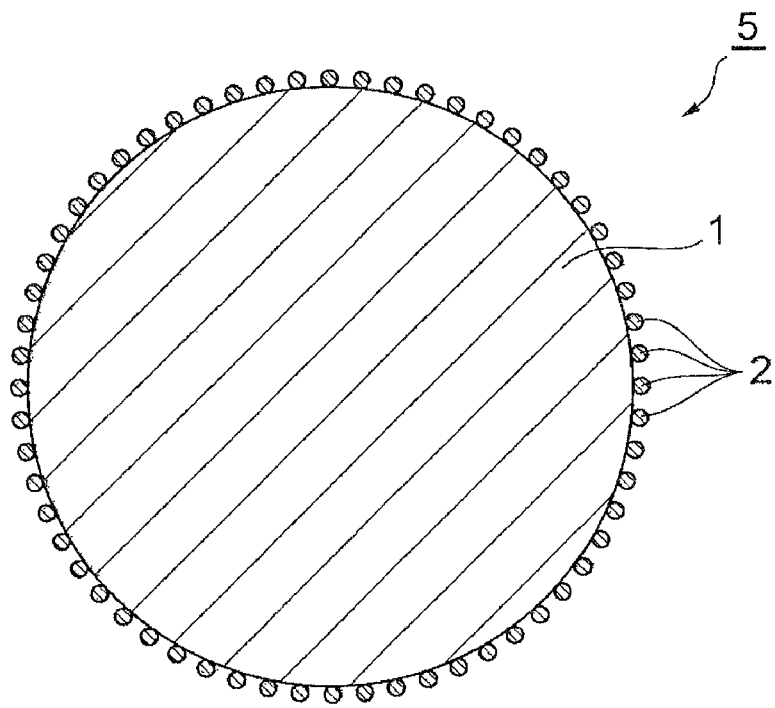
FIG. 2(a) and FIG. 2(b) are a simplified cross-sectional views of an active material according to this embodiment.
Figure 2:
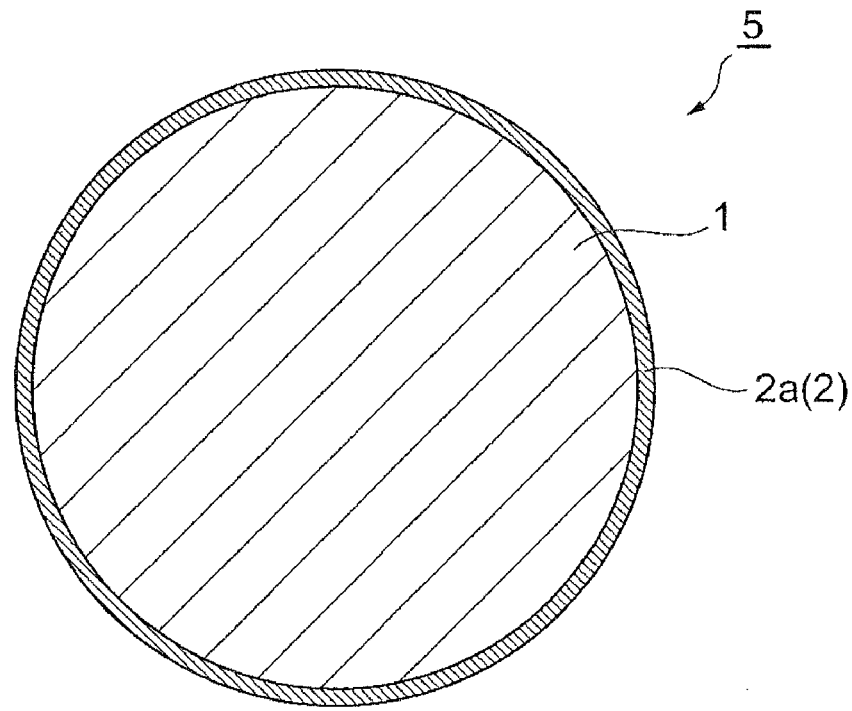

In other words, this treatment yields an active material 5 having fluoro complex-derived metal oxide particle groups 2 formed on the surfaces of lithium-containing metal oxide particles 1, as shown in FIG. 2(a).

The adhesive force of the fluoro complex-derived metal oxide particle groups 2 for the lithium-containing metal oxide particles 1 formed in this manner is greater than when a binder is used for adhesion. The adhesive force of the fluoro complex-derived metal oxide particle groups 2 for the lithium-containing metal oxide particles 1 is 0.1 µN or greater, and preferably 0.5 µN. The active material comprising the fluoro complex-derived metal oxide particle groups 2 adhering to the lithium-containing metal oxide particles 1 formed in the manner described above, will also contain F and/or B. The concentration of F in the entire active material (lithium-containing metal oxide particles+fluoro complex-derived metal oxide particle groups) may be 50-2000 ppm by weight and the concentration of B may be 10-1000 ppm by weight, for example.

The adhesive force of the particle groups can be measured by a scratch test using a nanoindentation apparatus. The nanoindentation apparatus causes indentation of the active material 5 sample while controlling the indenter with nm positional precision and µN load precision, to allow quantitation of the mechanical properties based on analysis of the load-deformation curve. The adhesiveness, or adhesive force, between the lithium-containing metal oxide particles 1 and fluoro complex-derived metal oxide particle groups 2 can be measured by the following two-stage step.

First, the active material sample is fixed to a board with an adhesive and the state of monodispersion without overlapping of active material is confirmed with an atomic force microscope (AFM, Nanoscopeilla+D3100, Digital Instruments). The conditions may be, for example, tapping mode, in air, with a measuring region of 5 µm×5 µm or 500 nm×500 nm. The sample may then be measured with a nanoindentation apparatus (for example, TribolIndenter by Hysitron). Specifically, a fixed perpendicular load is applied to the sample with an indenter (for example, a triangular pyramid indenter with a spherical tip (with a curvature radius of 1-50 nm, for example)), and then the indenter is moved in the horizontal direction (scratching) and the mean frictional coefficient is measured. The fixed perpendicular load applied with the indenter is varied on 4 or more levels and the mean frictional coefficient for each perpendicular load is measured. The perpendicular load is plotted on the horizontal axis while the mean frictional coefficient is plotted on the vertical axis, and the perpendicular load that initiates a rapid change in the mean frictional coefficient may be recorded as the adhesive force between the lithium-containing metal oxide particles 1 and the fluoro complex-derived metal oxide particle groups 2.

There is no particular upper limit on the adhesive force of the fluoro complex-derived metal oxide particle groups 2 for the lithium-containing metal oxide particles 1, but the lithium-containing metal oxide particles 1 will tend to undergo expansion and contraction during the charge-discharge process, and when the fluoro complex-derived metal oxide particle groups 2 have adhered more strongly than necessary to the lithium-containing metal oxide particles 1 during this process, minute cracks will tend to form in the lithium-containing metal oxide particles 1. From this viewpoint, the adhesive force of the fluoro complex-derived metal oxide particle groups 2 for the lithium-containing metal oxide particles 1 is no greater than 10 µN, for example, and preferably no greater than 3 µN.

The mean particle size of the fluoro complex-derived metal oxide particle groups 2 is preferably no greater than 50 nm. A mean particle size of the fluoro complex-derived metal oxide particle groups of 50 nm or smaller will tend to facilitate the effect of improved cycle characteristics. The particle sizes of the fluoro complex-derived metal oxide particle groups are the diameters in the direction along the surface of the lithium-containing metal oxide particles, and not the diameter in the thickness direction. The diameters can be easily measured based on a high-resolution electron microscope cross-sectional photograph, and the mean particle size can be easily determined by taking the number average.

The weight of the fluoro complex-derived metal oxide particle groups 2 with respect to the total of the lithium-containing metal oxide particles 1 and fluoro complex-derived metal oxide particle groups 2 is preferably 0.01 wt %-1.5 wt %.

If the weight proportion of the fluoro complex-derived metal oxide particle groups is less than this lower limit the effect of improved cycle characteristics will be reduced, and if it is above the upper limit the battery capacity will tend to be reduced.

The fluoro complex-derived metal oxide particle groups 2 will be partially adhering to the surface of the lithium-containing metal oxide in most cases, as shown in FIG. 2(a), but a layer 2a of each fluoro complex-derived metal oxide particle group 2 will sometimes be formed on the surface of the lithium-containing metal oxide particles 1, as shown in FIG. 2(b). The thickness of the layer 2a in such cases is not particularly restricted, but for example, it is preferably 1-200 nm and more preferably 10-100 nm.

The mean particle size of the fluoro complex-derived metal oxide particle groups, the weight proportion of the fluoro complex-derived metal oxide particle groups 2 with respect to the total of the lithium-containing metal oxide particles 1 and fluoro complex-derived metal oxide particle groups 2, and the presence or absence of a layer 2a and the thickness of the layer 2a, can be easily controlled by setting appropriate values for the contact time between the lithium-containing metal oxide particles 1 and aqueous solution, the temperature, and the concentration of the metal-fluoro complex or scavenger.

The pH of the aqueous solution for formation of the fluoro complex-derived metal oxide particle groups is preferably 5-12. The pH of the aqueous solution will usually vary depending on, for example, production of $H^+$ by equation (1) while the particle groups are being formed. The lithium-containing metal oxide may dissolve with a pH of less than 5, while at a pH of greater than 12 the metal ion of the metal-fluoro complex in the aqueous solution may form a hydroxide and precipitate. Consequently, the pH of the aqueous solution during formation of the particle groups may be kept at 5-12 to satisfactorily form fluoro complex-derived metal oxide particle groups on the lithium-containing metal oxide particles.

In order to keep the pH of the aqueous solution within the above-mentioned range while the particle groups are being formed, the pH of the aqueous solution before the particle groups are formed may be pre-specified in consideration of the range of pH variation, so that the pH after the particle groups have been formed is within the above-mentioned range, or an acid (hydrochloric acid or the like) or base (ammonia water or the like) may be added while the particle groups are being formed.

Once the electrode active material 5 having the fluoro complex-derived metal oxide particle groups 2 formed on the surfaces of the lithium-containing metal oxide particles 1 has been subjected to this treatment, it is filtered to separate the aqueous solution and active material 5, and the active material 5 is rinsed with water or the like and dried. It is also subjected to heat treatment if necessary. This can increase the crystallinity of the fluoro complex-derived metal oxide. Increasing the crystallinity of the fluoro complex-derived metal oxide inhibits decomposition of the electrolyte solution on the surfaces of the lithium-containing metal oxide particles 1, thus further improving the cycle characteristics.

The heat treatment temperature is not particularly restricted but is preferably 300-900° C. This can satisfactorily crystallize the fluoro complex-derived metal oxide particles. There are no particular restrictions on the heat treatment atmosphere as well, but it is preferably an air atmosphere. Crystallization will help to further improve the cycle characteristics.

(Method of Making Positive Electrode)

The active material 5 is used next to fabricate an electrode 10. First, a binder, a collector 12 and a conductive aid are prepared.

The binder is not particularly restricted so long as it can bind the active material and conductive aid to the collector, and any publicly known binder may be used. As examples there may be mentioned fluorocarbon polymers such as polyvinylidene fluoride (PVDF) and polytetrafluoroethylene (PTFE), and mixtures of styrene-butadiene rubber (SBR) with water-soluble polymers (carboxymethylcellulose, polyvinyl alcohol, sodium polyacrylate, dextrin, gluten and the like).

The collector 12 is then prepared. The collector 12 may be an aluminum foil.

As examples of conductive aids there may be mentioned carbon materials such as carbon black and carbon nanotubes, metal powder such as copper, nickel, stainless steel or iron, mixtures of carbon materials and metal fine powders, and conductive oxides such as ITO.

The active material 5, binder and conductive aid are added to a solvent to prepare a slurry. N-methyl-2-pyrrolidone or water, for example, may be used as the solvent.

The slurry containing the active material and binder is coated onto the surface of the collector 12 and dried and rolled to complete the positive electrode 10 comprising the positive electrode collector 12 and positive electrode active material layer 14, as shown in FIG. 1.

(Method of Making Negative Electrode)

The negative electrode 20 can be produced by a known method. Specifically, a copper foil or the like may be used as the negative electrode collector 22. The negative electrode active material layer 24 may be one containing a negative electrode active material, a conductive aid and a binder. The conductive aid and binder used may be the same as for the positive electrode.

As examples of negative electrode active materials there may be mentioned particles comprising carbon materials such as graphite, non-graphitizable carbon, graphitizable carbon and low-temperature fired carbon, which are capable of intercalation/deintercalation (or doping/undoping) of lithium ion, metals that can form compounds with lithium, such as Al, Si and Sn, crystalline or amorphous compounds composed mainly of oxides such as $TiO_2$ and $SnO_2$, or lithium titanate ($Li_4Ti_5O_{12}$) and the like.

The method of making the negative electrode 20 may involve preparing a slurry in the same manner as the method of making the positive electrode 10, and coating, drying and rolling it on a collector.

(Method of Making Electrochemical Device)

In addition to the positive electrode and negative electrode described above there are also prepared an electrolyte solution, separator 18, case 50 and leads 60, 62.

The electrolyte solution is added to the positive electrode active material layer 14, negative electrode active material layer 24 and separator 18. There are no particular restrictions on the electrolyte solution, and for this embodiment, for example, an electrolyte solution (electrolyte aqueous solution or organic solvent-based electrolyte solution) containing a lithium salt may be used. However, since electrolyte aqueous solutions are limited due to low electrochemical decomposition voltage and low durable voltage during charge, it is preferably an organic solvent-based electrolyte solution (non-aqueous electrolyte solution). The electrolyte solution preferably comprises a lithium salt dissolved in a non-aqueous solvent (organic solvent). As lithium salts there may be used, for example, salts such as $LiPF_6$, $LiClO_4$, $LiBF_4$, $LiAsF_6$, $LiCF_3SO_3$, $LiCF_3$, $CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$ and LiBOB. These salts may be used alone or in combinations of two or more.

As examples of preferred organic solvents there may be mentioned propylene carbonate, ethylene carbonate, diethyl carbonate and dimethyl carbonate. These may be used alone or in combinations of two or more in any desired proportion.

For this embodiment, the electrolyte solution may be a non-liquid gelatinous electrolyte obtained by adding a gelling agent. A solid electrolyte (solid polymer electrolyte or an electrode composed of an ionic conductive inorganic material) may be added instead of an electrolyte solution.

The separator 18 may also be formed from an electrical insulating porous body, and as examples there may be mentioned monolayer films and laminated bodies composed of polyethylene, polypropylene or polyolefin, or stretched films comprising resin mixtures, or fiber nonwoven fabrics composed of one or more structural materials selected from the group consisting of cellulose, polyester and polypropylene.

The case 50 has the laminated body 30 and electrolyte solution sealed therein. The case 50 is not particularly restricted so long as it can prevent leakage of the electrolyte solution to the exterior, and infiltration of moisture and the like into the electrochemical device 100 from the exterior. For example, the case 50 may be a metal laminate film comprising a metal foil 52 coated on both sides with a polymer film 54, as shown in FIG. 1. The metal foil 52 may be, for example, an aluminum foil, and the polymer film 54 may be a polypropylene or other film. The material for the outer polymer film 54 is preferably, for example, a polymer with a high melting point such as polyethylene terephthalate (PET) or polyamide, while the material for the inner polymer film 54 is preferably polyethylene or polypropylene.

The leads 60, 62 are formed from a conductive material such as aluminum or nickel.

A known method may be used for welding of the leads 60, 62 respectively to the positive electrode collector 12 and negative electrode collector 22, and insertion into the case 50 together with the electrolyte solution, with the separator 18 sandwiched between the positive electrode active material layer 14 of the positive electrode 10 and the negative electrode active material layer 24 of the negative electrode 20, and finally sealing of the opening of the case 50.

The electrochemical device of this embodiment employs an active material 5 having fluoro complex-derived metal oxide particle groups 2 on the surface of a lithium-containing metal oxide 1. This type of electrochemical device has improved charge-discharge cycle characteristics, and especially improved charge-discharge cycle characteristics at high temperature. While the reason for this is not entirely clear, it is believed that, even during charge-discharge, the fluoro complex-derived metal oxide particle groups 2 contributes at least to inhibiting elution of the element of the lithium-containing metal oxide particles 1 into the electrolyte solution, and/or inhibiting decomposition and deterioration of the electrolyte solution or electrolyte by the lithium-containing metal oxide, and/or inhibiting destruction of the crystals of the lithium-containing metal oxide, and/or improving the thermostability of the lithium-containing metal oxide. It is also believed that the high adhesive force of the fluoro complex-derived metal oxide particle groups 2 for the lithium-containing metal oxide particles in this embodiment also has an effect.

Particularly, since the adhesive force of the fluoro complex-derived metal oxide particle groups 2 for the lithium-containing metal oxide particles 1 can be 0.1 µN or greater for this embodiment, the adhesiveness is excellent between the lithium-containing metal oxide particles 1 and fluoro complex-derived metal oxide particle groups 2, and when the active material 5 is used to fabricate an electrode, the fluoro complex-derived metal oxide particle groups 2 do not easily ablate from the lithium-containing metal oxide particles 1 even with treatment such as kneading and agitation. This presumably enhances the effect of inhibiting decomposition and deterioration of the electrolyte solution or electrolyte, the effect of inhibiting destruction of the lithium-containing metal oxide crystals, and the effect of improving the thermostability of the lithium-containing metal oxide, compared to covered particles produced by prior art methods, when the material is used in a battery.

In addition, it is believed that the presence of the lithium salt in the metal-fluoro complex-containing aqueous solution also produces the following effect for this embodiment. First, it inhibits removal of lithium ion from the lithium-containing metal oxide during contact with the aqueous solution. This can satisfactorily maintain the initial discharge capacity of the active material even after contact. Moreover, since elution of lithium from the lithium-containing metal oxide surface is inhibited, deposition of the particles on the lithium-containing metal oxide surfaces is promoted and excessive grain growth of the lithium-containing metal oxide in the aqueous solution is prevented. In addition, when the aqueous solution contains a lithium salt, the mean free path for the fine particles and ions in the aqueous solution is reduced, and excessive grain growth of the lithium-containing metal oxide in the aqueous solution is further inhibited. This promotes deposition of the fluoro complex-derived metal oxide particle groups that have relatively narrow particle sizes, to a high coverage factor on the surface of the lithium-containing metal oxide, thus notably contributing to improved cycle characteristics. When no lithium salt is added to the aqueous solution but lithium elutes from the lithium-containing metal oxide surfaces during contact with the aqueous solution, deposition of the particles on the lithium-containing metal oxide surfaces becomes difficult and the mean free path of fine particles and ions in the aqueous solution is increased, such that growth of the fluoro complex-derived metal oxide in the aqueous solution is promoted and the particle sizes of the metal oxide particles deposited on the lithium-containing metal oxide surfaces are increased, thus tending to lower the coverage factor.

This embodiment therefore can exhibit a satisfactory charge-discharge cycle even with charging at higher voltage than usual, thus allowing charging to be accomplished at higher voltage than the prior art. This tendency is particularly high with a metal oxide containing lithium and a metal other than lithium, such as $LiCo_xNi_yMn_{1-x-y}O_2$ or $Li_aNi_xCo_yAl_{1-x-y}O_2$, as the first metal oxide.

(Second Embodiment)

The second embodiment of the invention will now be explained. According to the invention, the lithium-containing metal oxide particles 1 are used before forming the fluoro complex-derived metal oxide particle groups 2, to produce a positive electrode 10 already comprising a positive electrode active material layer 14, and then the positive electrode 10 is contacted with an aqueous solution containing a metal-fluoro complex to form fluoro complex-derived metal oxide particle groups 2 on the surfaces of the lithium-containing metal oxide particles 1 in the positive electrode active material layer 14. That is, the lithium-containing metal oxide particles in the positive electrode active material layer 14 are modified.

The method of making the positive electrode 10 is the same as for the first embodiment, except for using lithium-containing metal oxide particles that have not been surface-modified. The aqueous solution containing the metal-fluoro complex and lithium salt, which is contacted with the positive electrode 10, is also the same as for the first embodiment. The conditions for contact may also be the same as for the first embodiment. Particularly when the collector 12 of the positive electrode 10 is Al, the Al functions as a scavenger to promote surface modification. When the Al collector is used as a scavenger, the Al collector is eroded but not to a point that impairs its function as a collector.

According to this embodiment as well, treatment of the positive electrode causes modification of the surfaces of the lithium-containing metal oxide particles in the positive electrode active material layer in the same manner as the first embodiment, forming the fluoro complex-derived metal oxide particles groups 2. This produces the same effect as the first embodiment.

The fluoro complex-derived metal oxide particle groups 2 are formed on the surfaces of the lithium-containing metal oxide particles 1 serving as the positive electrode active material in this embodiment, but when the negative electrode active material particles are composed of a metal oxide, the same effect can be obtained by forming the same fluoro complex-derived metal oxide particle groups 2 on the lithium-containing metal oxide particles serving as the negative electrode active material. For example, a notable effect is obtained when the lithium-containing metal oxide as the negative electrode active material is a metal oxide such as $Li_4Ti_5O_{12}$ or $SiO_x$ (x<2).

The embodiment described above is for a secondary battery, but the same effect is also exhibited for an electrical double layer capacitor or hybrid electrical double layer capacitor. With an electrical double layer capacitor, for example, a notable effect is obtained when using $RuO_2$ or the like as the active material.

EXAMPLE 1

In Example 1, $Li_{1.0}Ni_{0.79}Co_{0.19}Al_{0.02}O_2$ particles were used as the lithium-containing metal oxide for the positive electrode.

[Surface Modification of First Metal Oxide with Zr Fluoro Complex]

SnF$_2$ (product of Morita Chemical Industries Co., Ltd.), H$_3$BO$_3$ (product of Kanto Kagaku Co., Ltd.) and LiNO$_3$ (product of Kanto Kagaku Co., Ltd.) were each dissolved in water to 0.01 M, 0.05 M and 1 M, respectively (to form a solution hereinafter referred to as "LPD treatment solution"). Li$_{1.0}$Ni$_{0.79}$Co$_{0.19}$Al$_{0.02}$O$_2$ particle groups (mean particle size: 13 μm) were loaded into the solution kept at 40° C., and the mixture was agitated for 3 hours.

Figure 3:
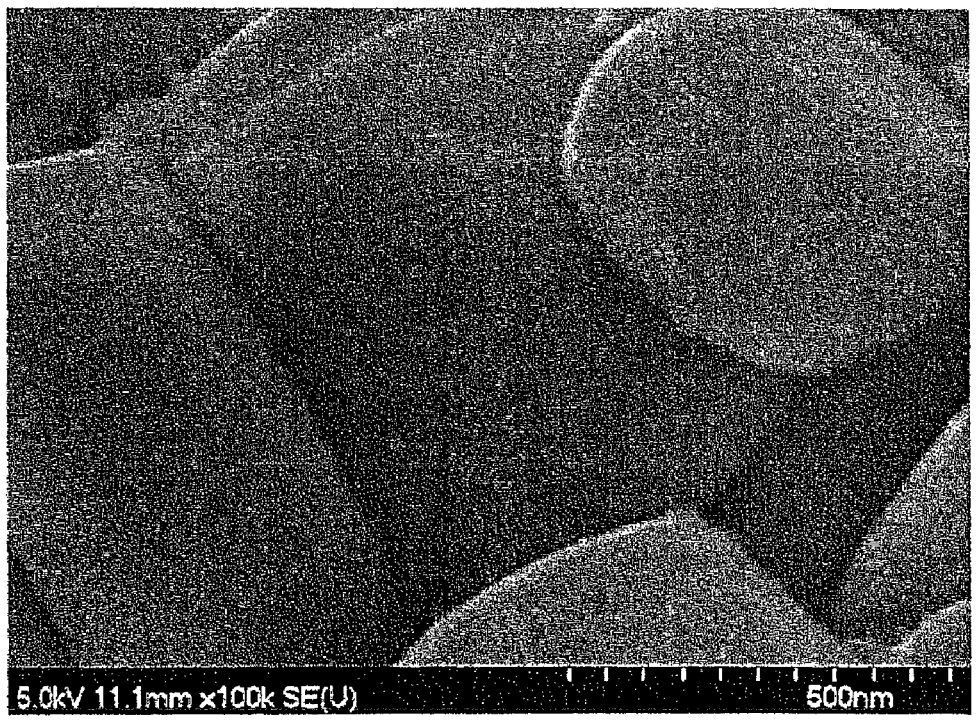
FIG. 3 is an SEM photograph of the active material obtained in Example
Figure 4:
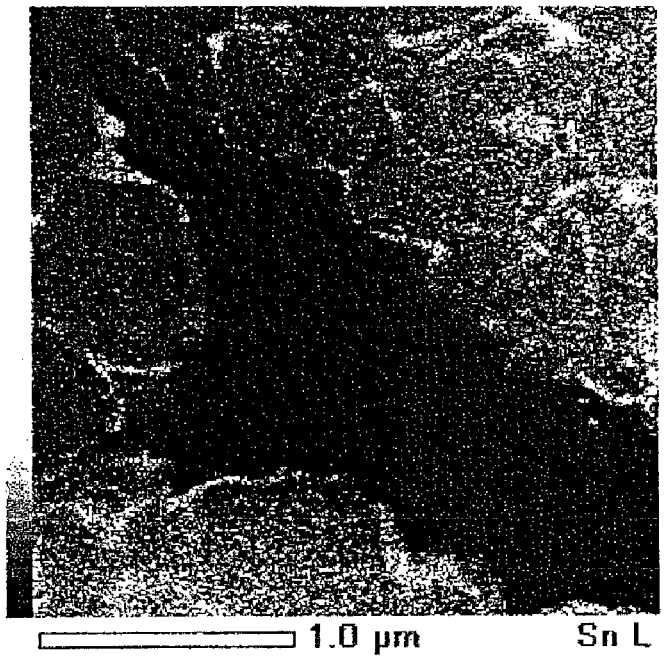
FIG. 4(a) and FIG. 4(b) are TEM photographs of the active material obtained in Example 1.
Figure 4:
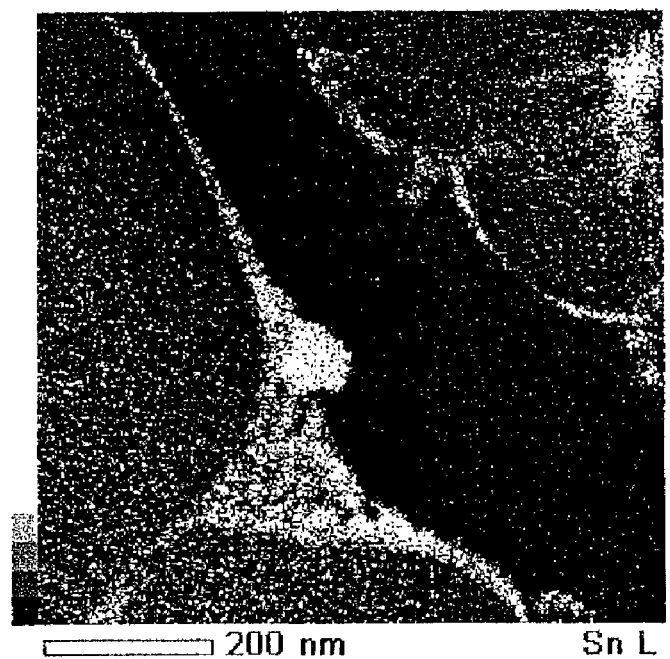

The solution was then filtered, washed with water and dried to obtain active material particles. An SEM photograph is shown in FIG. 3, TEM photographs are shown in FIG. 4(a) and FIG. 4(b), and the results of chemical analysis of the obtained active material by ICP (inductively coupled plasma emission spectroscopy) are shown in Table 2. An SnO$_2$ diffraction peak was obtained by XRD. The diffraction peak indicated that the SnO$_2$ was crystalline. The SEM photograph and TEM photographs indicated that the surfaces of the Li$_{1.0}$Ni$_{0.79}$Co$_{0.19}$Al$_{0.02}$O$_2$ particles were covered by SnO$_2$ particle groups (mean particle size: ≦20 nm). The SnO$_2$ particle groups clearly covered the lithium-containing metal oxide surfaces uniformly with a high coverage factor. The results of chemical analysis of the active material (see Table 2) showed no traces of Li ion elution from the lithium-containing metal oxide. The active material contained 0.93 wt % SnO$_2$.

[Fabrication of Cell Electrode]

Fabrication of Positive Electrode

A positive electrode was fabricated using the previously formed positive electrode active material as the cell active material, CB (carbon black, DAB50 by Denki Kagaku Kogyo Co., Ltd.) and graphite (KS-6 by Timcal) as conductive aids and PVDF (polyvinylidene fluoride, KF7305 by Kureha Corp.) as the binder. An NMP (N-methyl-2-pyrrolidinone) solution of the PVDF was added to and mixed with the positive electrode active material, CB and graphite to prepare a coating material. After coating the coating material onto an aluminum foil (thickness: 20 μm) as the collector by doctor blading, it was dried (100° C.) and rolled.

Fabrication of Negative Electrode A

A Li foil was cut to a prescribed size and attached to a copper foil (thickness: 15 μm) to form negative electrode A.

Fabrication of Negative Electrode B

A negative electrode was fabricated using natural graphite as the cell active material, CB as a conductive aid and PVDF as the binder. The KF7305 was added to and mixed with the natural graphite and CB to prepare a coating material. After coating the coating material onto a copper foil as the collector (thickness: 16 μm) by doctor blading, it was dried (100° C.) and rolled.

[Formation and Evaluation of Half Cell]

The positive electrode and negative electrode A were laminated with a polyethylene separator sandwiched between them, to obtain a laminated body (element assembly). An aluminum foil (width: 4 mm, length: 40 mm, thickness: 80 μm) and nickel foil (width: 4 mm, length: 40 mm, thickness: 80 μm) were ultrasonically welded as external lead terminals to the positive electrode and negative electrode, respectively. Polypropylene (PP) with maleic anhydride already grafted thereon was wound around the external lead terminals and thermally bonded thereto. This was done to improve the seal property between the external terminals and outer casing. The cell outer casing was composed of an aluminum laminate material, having the construction: PET(12)/Al(40)/PP(50). PET represents polyethylene terephthalate and PP represents polypropylene. The values in parentheses are the thicknesses of each layer (units: μm). A envelope was formed with the PP facing inward. The laminated body was placed in the cell outer casing and the 1 M LiPF$_6$/EC+DEC (30:70 volume ratio) electrolyte solution was injected therein, after which it was vacuum heat sealed to produce a half cell for electrode evaluation.

The half cell was subjected to constant current charging with a charge current of 0.1 C until the voltage reached 4.3 V, and then it was subjected to constant voltage charging at 4.3 V to full charge. It was then discharged to 3.0 V at a discharge current of 0.1 C, and the discharge capacity per unit weight of the positive electrode active material was 194 mAh/g. The C value for this example was calculated to be: rated discharge capacity=190 mAh/g. Also, the charge-discharge efficiency was 95% in a high-temperature charge-discharge test (constant current charging to 4.5 V (vs. Li/Li$^+$) at 60° C. with a current of 0.1 C, followed by constant voltage charging at 4.5 V until a current of 1/20 C was reached, for a total of 100 hours charging with constant current charging and constant voltage charging, and then discharge to 3.0 V at 0.1 C (vs. Li/Li$^+$)). An efficiency of 100% was not obtained presumably because of irreversible secondary reactions such as decomposition of the electrolyte solution occurring on the positive electrode active material surface. Irreversible secondary reactions are preferably minimized since they are associated with deterioration of cell cycle characteristics and reduced safety.

[Formation of Full Cell]

The previously prepared positive electrode, negative electrode B and a separator (polyolefin microporous film) were cut to prescribed dimensions. Sections of the positive electrode and negative electrode were left uncoated with the electrode coating material (active material+conductive aid+binder) for welding of the external lead terminals. The positive electrode, negative electrode and separator were laminated in that order. During the lamination, a small amount of hot-melt adhesive (ethylene-methacrylic acid copolymer, EMAA) was coated for anchoring to prevent slippage of the positive electrode, negative electrode and separator. The rest of the procedure was the same as for the half cell, to produce a full cell (lithium ion secondary battery).

[Evaluation of Full Cell]

The full cell was subjected to 300 repeated cycles at 60° C., where one cycle consisted of constant current charging to 4.2 V at 1 C and constant voltage charging at 4.2 V, followed by discharge to 3.0 V at 1 C (cycle test). The discharge capacity (hereinafter also referred to as "capacity retention") after 300 cycles was 93%, with 100% as the initial discharge capacity.

COMPARATIVE EXAMPLE 1

The same procedure was carried out as in Example 1, except that Li$_{1.0}$Ni$_{0.79}$Co$_{0.19}$Al$_{0.02}$O$_2$ particles that had not been contacted with an LPD treatment solution were used as the positive electrode active material.

The discharge capacity was determined to be 194 mAh/g with a half cell. The charge-discharge efficiency in a half cell acceleration test was 80%. After 300 cycles of charge-discharge of the full cell, the capacity retention was 63%.

COMPARATIVE EXAMPLE 2

Figure 5:
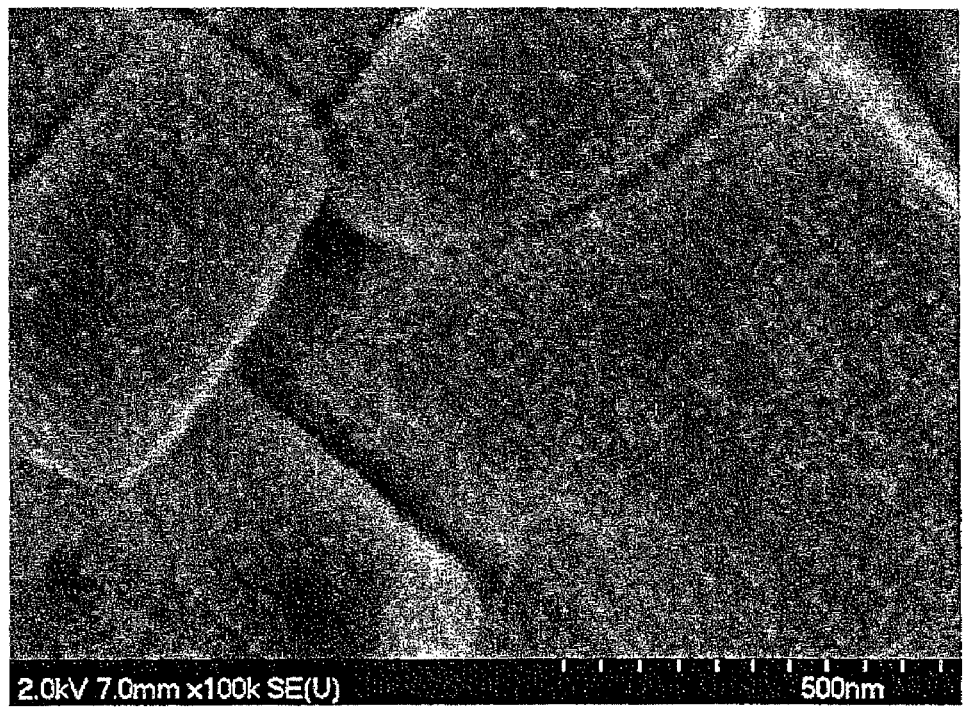
FIG. 5 is an SEM photograph of the active material obtained in Comparative Example 2.

The same procedure was carried out as in Example 1, except that an LPD treatment solution containing no LiNO$_3$ was used. An SEM photograph of the obtained active material is shown in FIG. 5. Numerous SnO$_2$ particles (mean particle size: 20 nm) were adhering to the lithium-containing metal oxide surfaces. As a result of chemical analysis, the lithium was found to be reduced compared to before treatment with the LPD treatment solution. When a half cell was used to examine the rated discharge capacity, it was 185 mAh/g, which was lower than without LPD treatment. The charge-discharge efficiency in a half cell acceleration test was 86%. After 300 cycles of charge-discharge of the full cell, the capacity retention was 83%.

EXAMPLE 2

Figure 6:
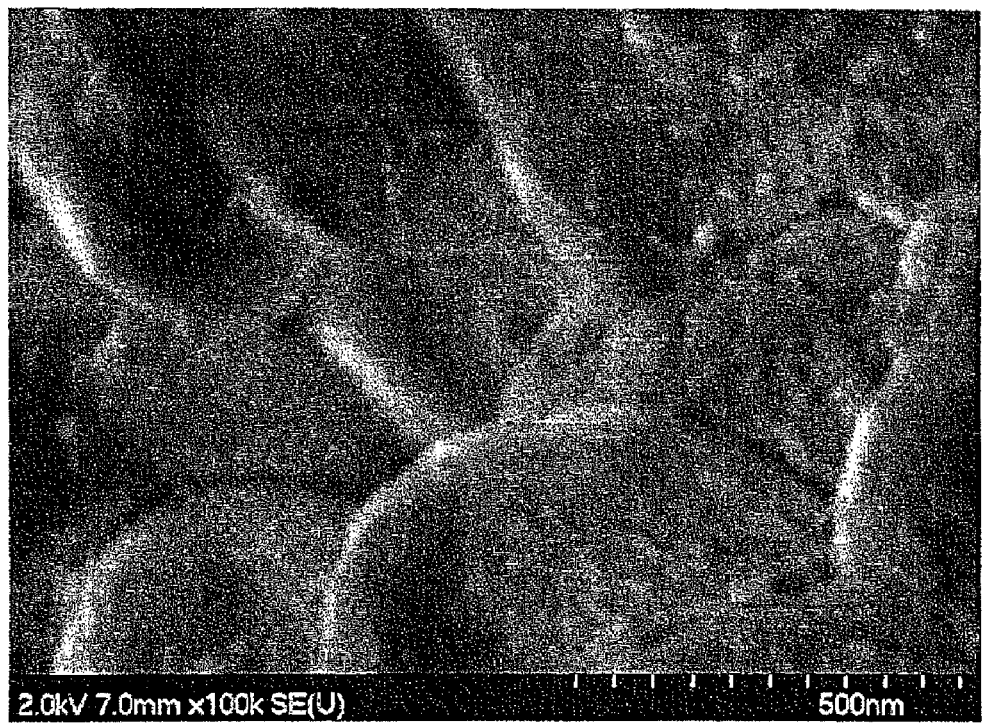
FIG. 6 is an SEM photograph of the active material obtained in Example 2.

The same procedure was carried out as in Example 1, except that $(NH_4)_2TiF_6$ was used instead of $SnF_2$. An SEM photograph of the obtained active material is shown in FIG. 6. $TiO_2$ particles (mean particle size: 50 nm) were adhering to the lithium-containing metal oxide surfaces, essentially uniformly with a high coverage factor. The results of XRD indicated that the $TiO_2$ particles were crystalline. No elution of Li was seen in chemical analysis of the active material. The discharge capacity was determined to be 194 mAh/g with a half cell. The charge-discharge efficiency in a half cell acceleration test was 94%. After 300 cycles of charge-discharge of the full cell, the capacity retention was 92%.

COMPARATIVE EXAMPLE 3

The same procedure was carried out as in Example 2, except that an LPD treatment solution containing no $LiNO_3$ was used. When a half cell was used to examine the discharge capacity, it was 184 mAh/g, which was lower than without LPD treatment. The charge-discharge efficiency in a half cell acceleration test was 85%. After 300 cycles of charge-discharge of the full cell, the capacity retention was 83%.

EXAMPLE 3

Figure 7:
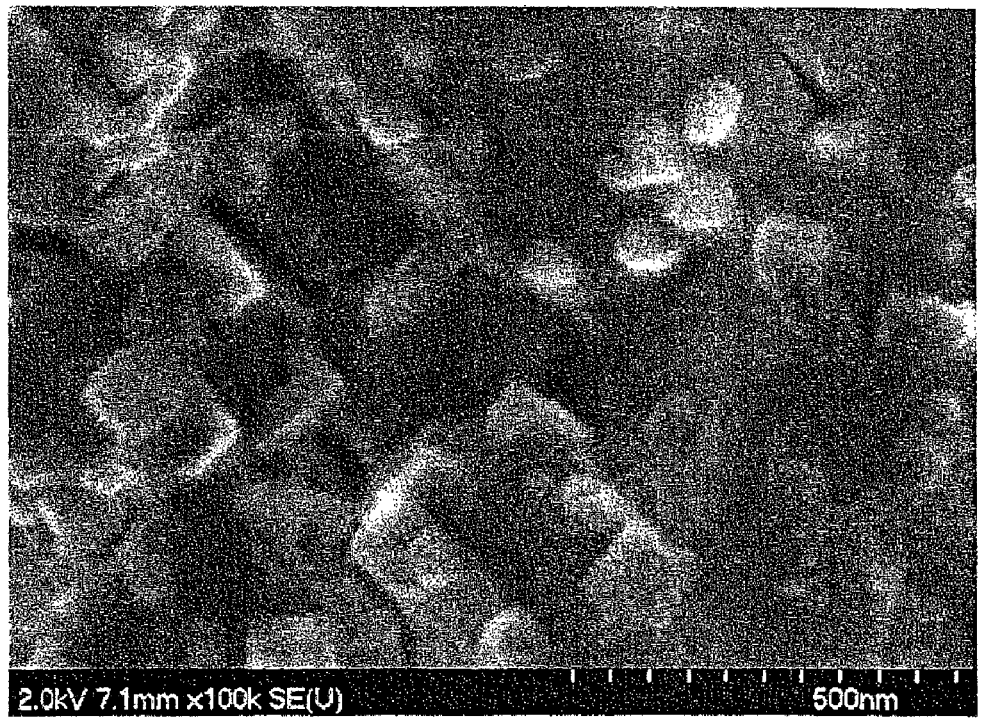
FIG. 7 is an SEM photograph of the active material obtained in Example 3.

The same procedure was carried out as in Example 1, except that $K_2ZrF_6$ was used instead of $SnF_2$, and the obtained active material was heat treated at 700° C. for 2 hours in air. An SEM photograph of the obtained active material is shown in FIG. 7. $ZrO_2$ particles (mean particle size: 80 nm) were adhering to the lithium-containing metal oxide surfaces, essentially uniformly. The results of XRD indicated that the $ZrO_x$ particles were crystalline. No elution of Li was seen in chemical analysis of the active material. The discharge capacity was determined to be 194 mAh/g with a half cell. The charge-discharge efficiency in a half cell acceleration test was 94%. After 300 cycles of charge-discharge of the full cell, the capacity retention was 92%.

COMPARATIVE EXAMPLE 4

The same procedure was carried out as in Example 3, except that an LPD treatment solution containing no $LiNO_3$ was used. When a half cell was used to examine the discharge capacity, it was 175 mAh/g, which was lower than without LPD treatment. The charge-discharge efficiency in a half cell acceleration test was 85%. After 300 cycles of charge-discharge of the full cell, the capacity retention was 82%.

EXAMPLE 4

The same procedure was carried out as in Example 3, except that $(NH_4)_2SiF_6$ was used instead of $K_2ZrF_6$. $SiO_2$ particles (mean particle size: 70 nm) were adhering to the lithium-containing metal oxide surfaces, essentially uniformly. The results of XRD indicated that the $SiO_2$ particles were crystalline. No elution of Li was seen in chemical analysis of the active material. The discharge capacity was determined to be 194 mAh/g with a half cell. The charge-discharge efficiency in a half cell acceleration test was 94%. After 300 cycles of charge-discharge of the full cell, the capacity retention was 92%.

COMPARATIVE EXAMPLE 5

The same procedure was carried out as in Example 4, except that an LPD treatment solution containing no $LiNO_3$ was used. When a half cell was used to examine the discharge capacity, it was 184 mAh/g, which was lower than without LPD treatment. The charge-discharge efficiency in a half cell acceleration test was 84%. After 300 cycles of charge-discharge of the full cell, the capacity retention was 83%. The chemical analysis results for each of the examples and comparative examples are shown in Table 2, and the conditions and evaluation results are shown in Table 3.

TABLE 2

| | Mass % | | | | | |
|---|---|---|---|---|---|---|
| | Li | Al | Co | Ni | Sn | Total |
| Example 1 | 7.26 | 0.69 | 11.2 | 47.3 | 0.73 | 67.14 |
| Comp. Ex. 1 | 7.26 | 0.71 | 11.4 | 47.4 | 0.008 | 66.78 |
| Comp. Ex. 2 | 7.00 | 0.68 | 11.2 | 47.5 | 0.73 | 67.06 |

TABLE 3

| | Fluoro complex-derived metal oxide | Lithium salt | Heat treatment | Half cell | | Full cell Capacity retention after 300 cycles at 60° C. (%) |
|---|---|---|---|---|---|---|
| | | | | Discharge capacity per weight of positive electrode active substance (mAh/g) | Charge-discharge efficiency in high-temperature charge-discharge test (%) | |
| Example 1 | $SnO_2$ | $LiNO_3$ | None | 194 | 95 | 93 |
| Comp. Ex. 1 | None | None | None | 194 | 80 | 63 |
| Comp. Ex. 2 | $SnO_2$ | None | None | 185 | 86 | 83 |
| Example 2 | $TiO_2$ | $LiNO_3$ | None | 194 | 94 | 92 |
| Comp. Ex. 3 | $TiO_2$ | None | None | 184 | 85 | 83 |
| Example 3 | $ZrO_2$ | $LiNO_3$ | 700° C. | 194 | 94 | 92 |
| Comp. Ex. 4 | $ZrO_2$ | None | 700° C. | 175 | 85 | 82 |
| Example 4 | $SiO_2$ | $LiNO_3$ | 700° C. | 194 | 94 | 92 |
| Comp. Ex. 5 | $SiO_2$ | None | 700° C. | 184 | 84 | 83 |

What is claimed is:

1. A method of making an active material, comprising a step of contacting an aqueous solution containing a metal-fluoro complex and lithium salt with lithium-containing metal oxide particles, wherein the metal of the metal-fluoro complex is at least one metal selected from the group consisting of Zr, Si, Ti, and Sn, and wherein the method further comprises a step of heat treatment of the contacted lithium-containing metal oxide particles at 300-900° C.

2. The method of making an active material according to claim 1, wherein the aqueous solution further comprises a scavenger that chemically scavenges fluoride ion from the metal-fluoro complex.

3. The method of making an active material according to claim 1, wherein the lithium-containing metal oxide is $Li_aNi_xCo_yAl_{1-x-y}O_2$ (where 0.98<a<1.2, 0<x, y<1).

4. The method according to claim 1, wherein the lithium salt is $LiNO_3$.

5. A method of making an electrode, which comprises a step of contacting an aqueous solution containing a metal-fluoro complex and lithium salt with an electrode comprising an active material layer that contains lithium-containing metal oxide particles, a conductive aid, and a binder, wherein the metal of the metal-fluoro complex is at least one metal selected from the group consisting of Zr, Si, Ti, and Sn, and wherein the method further comprises a step of heat treatment of the contacted lithium-containing metal oxide particles at 300-900° C.

* * * * *